Nov. 17, 1953 — H. L. COGGBURN — 2,659,214
AUTOMOBILE AIR CONDITIONING UNIT
Filed Sept. 27, 1952 — 2 Sheets-Sheet 2
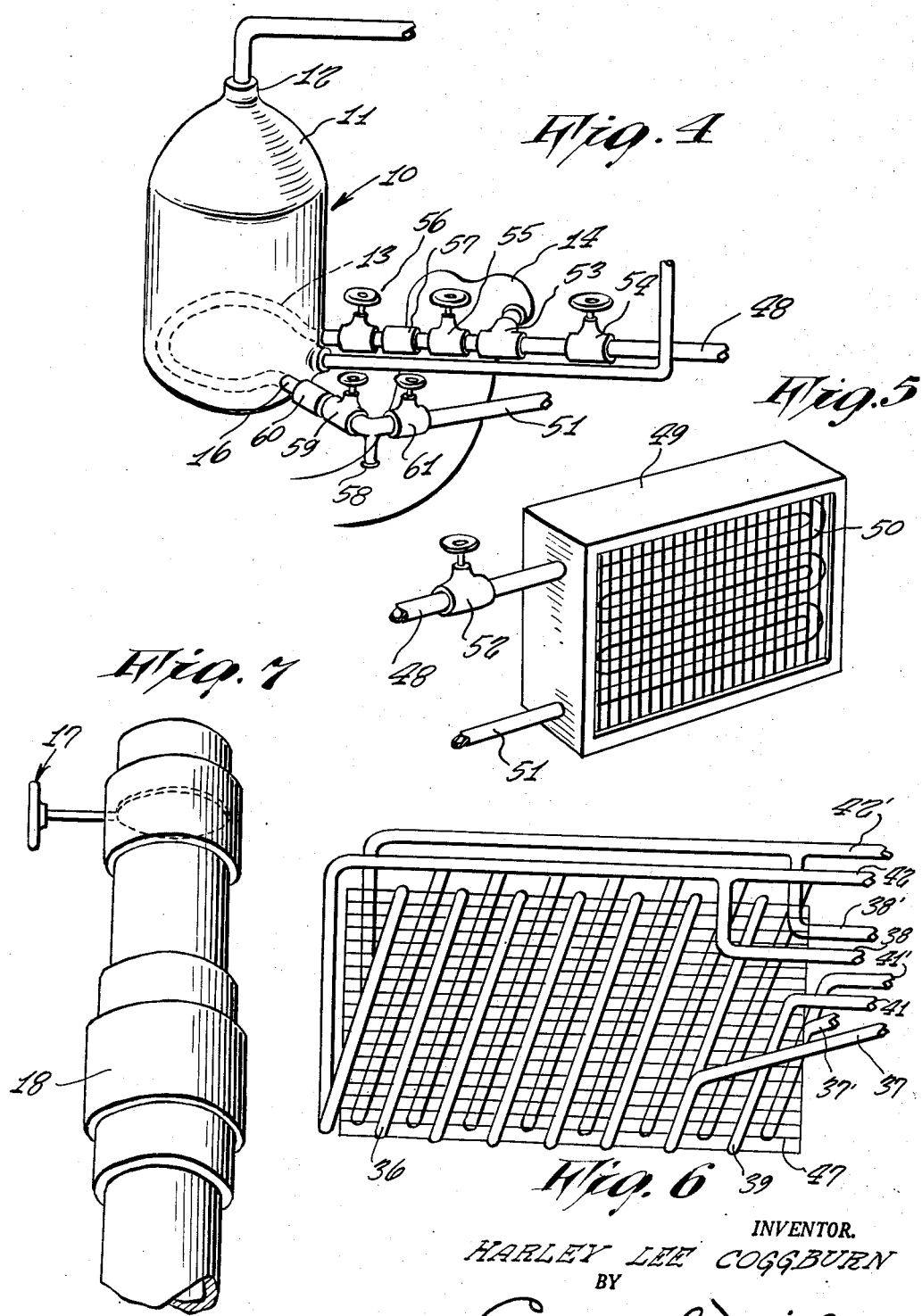
INVENTOR.
HARLEY LEE COGGBURN
BY
Carl Miller
ATTORNEY Patented Nov. 17, 1953

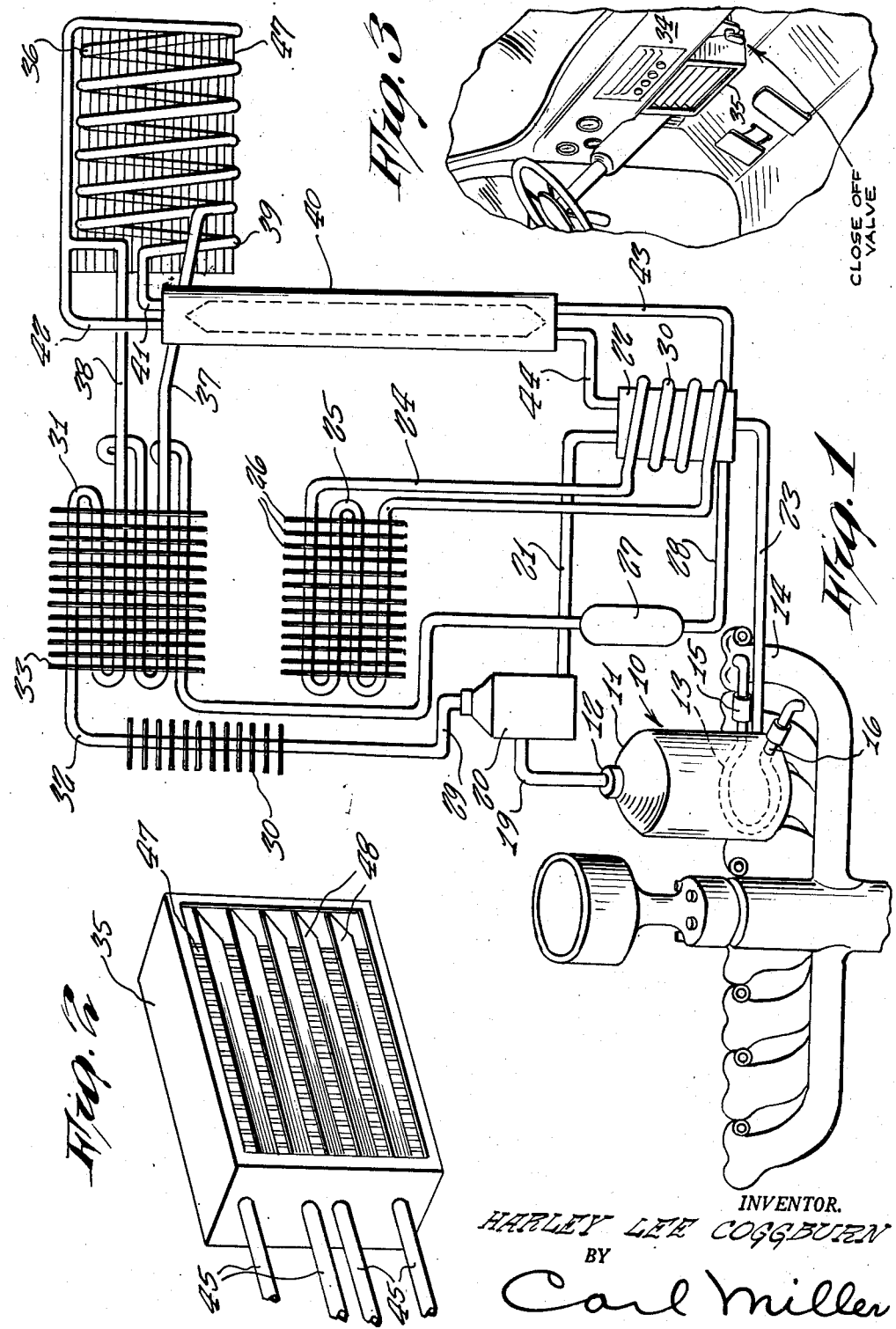

2,659,214

UNITED STATES PATENT OFFICE 2,659,214

AUTOMOBILE AIR CONDITIONING UNIT

Harley Lee Coggburn, Big Bear Lake, Calif.

Application September 27, 1952, Serial No. 311,864

5 Claims. (Cl. 62—119.5)

1

This invention relates to automobile air-conditioning units.

I have found that the hot gases from the exhaust manifold of an automobile are possessed of sufficient thermal energy to cause ammonia liquids to rise and travel through a refrigeration system.

It is accordingly a principal object of the present invention to provide an air-conditioning unit for an automobile which utilizes the thermal energy of the hot gases from the exhaust manifold to cause ammonia liquids to rise and travel through the system, the vacuum pull from the intake manifold of the automobile being utilized to draw the hot gases through a generator to be hereinafter described.

It is another object of the present invention to provide an air conditioning unit for an automobile which includes staggered evaporator coils permitting the addition of further coils when necessary whereby the refrigeration capacity can be increased to meet any need, such as cold storage trucks, limited only by the thermal energy contained in the hot gases leaving the exhaust manifold.

It is still another object of the present invention to provide an air-conditioning unit of the above type which can readily and easily be converted to a heating system in winter.

Other objects of the present invention are to provide an air-conditioning unit for an automobile bearing the above objects in mind which is of simple construction, inexpensive to manufacture, has a minimum number of parts, is compact, will have long life, is easy to operate and efficient in operation.

For other objects and for a better understanding of the invention, reference may be had to the following detailed description taken in connection with the accompanying drawing, in which:

Fig. 1 is a diagrammatic representation of the arrangement and location of the different instrumentalities employed together with their conduits and wiring;

Fig. 2 is a perspective view of the evaporator coil unit and its metal box casing which is mounted under the dash board;

Fig. 3 is fragmentary perspective view of the dash board showing the position of the unit shown in Fig. 2;

Fig. 4 is a perspective view of a modified form of the present invention;

Fig. 5 is a perspective view of the heating unit adapted to be used with the present invention during winter;

2

Fig. 6 is a front elevational view of a modified form of evaporating coils and

Fig. 7 is an enlarged detail view of the valve controlling heat to the generator, and which is connected to the intake manifold.

Referring now particularly to Figs. 1-3 and 7, and in the practice of my invention, there is shown a generator, referred to collectively as 10, of refractory brick or other suitable material and preferably cylindrical, curving towards the top as at 11 and terminating with a narrow neck 12.

A pipe 13 of suitable heat conductive material such as copper is connected to the exhaust manifold 14 through a union 15, and enters the generator 10 at the bottom thereof, extending around the interior substantially as illustrated in Fig. 1 to exit as at 16. Where the pipe 13 enters the generator wall it is welded or stuffed to prevent leakage from the generator, this being equally true where the pipe leaves the generator.

Referring now particularly to Fig. 7, a valve 17 is connected to the pipe at 16 and connected to the exhaust intake manifold by a union 18 whereby to regulate the heat required.

The intake manifold will have a vacuum pull which will draw the hot gases from the exhaust manifold through the pipe 13, which is immersed in ammonia liquids above the bottom of the generator 10, the valve 17 being automatically controlled as heat is required. Mechanisms for automatically controlling the valve 17 to regulate the hot gases through the pipe 13 are well known and have not therefore been described. For example, a suitable thermostat, to be set from the dash board, can be connected to the valve 17 to close it when too much heat is coming through and to open it when more heat is required.

A suitable fluid such as ammonia water fills the generator 10. This liquid can be heated by the pipe 13 at the bottom of the generator and is forced upwardly to a conduit 19 which leads to a separator 20 for separating vapor from liquid. In the separator 20 the ammonia vapors separate from the water solvent and the water is led through a conduit 21 to an absorber 22 from which it returns through a conduit 23 to the generator 10, wherein the process is repeated.

A cooling system consists of radiator sections which are provided with a piping conduit 24 which is coiled at 30 around the absorber 22 and has coils 25 within the radiator discs 26.

A reserve vessel 27 supplies liquid to the lower end of the absorber 22 through the conduit 28.

From the upper end of the separator 20 the vapors rise through the conduit 29, passing through the rectifier 30, into the coils 31 by way of conduit 32, said coils being contained in the condenser 33. The lower part of condenser 33 is connected with a storage tank 27 for a suitable inert gas such as hydrogen. In the event that the atmospheric temperature rises, a higher pressure within the system will be necessary for condensation of ammonia to take place within the condenser. This higher pressure is obtained by the fact that when the temperature increases a portion of the ammonia will pass through the condenser without being liquified and will pass through the conduit leading to the storage vessel 27, into the vessel and displace therefrom the stored hydrogen which passes through conduit 28 to the absorber.

The instrumentality so far described, is installed under the hood of the automobile separated from the dash board proper 34 which contains a metal box casing 35 which fits thereunder, as shown in Fig. 3, and one end of which encloses evaporator coils 36 connected by way of conduit 37, to one end of the coils 31 in the condenser 33, while the other end of the coil 31 connects through conduit 38, with evaporator coils 39 enclosed at the other end of the casing 35. The coils 36 and 39 within the casing 35 lead into heat exchanger 40 by means of conduits 41 and 42, respectively. Said heat exchanger 40 connects with the lower end of the absorber 22 by means of conduit 43 being a continuation of conduit 42 from coil 36 of the evaporator; while another conduit 44 leads from the absorber 22 to the heat exchanger 40 and continues by way of the other coil 39 of the evaporator, thus completing the circuit. Hydrogen gas is admitted in the left hand end of the coil in the evaporator through the conduit 41 and comes into intimate contact with the liquid ammonia introduced into the evaporator. The ammonia evaporates and diffuses into the hydrogen which evaporation results in the absorption of heat from the casing 35. During its passage through the heat exchanger 40 the cold gaseous mixture in conduit 42 absorbs heat from the hydrogen in the exchanger 40 thus cooling the hydrogen before it is admitted to the evaporator.

It will now be seen that the evaporator, aided by coils 36 and 39, will cool air passing through the casing 35, and thus provide the needed low temperature in the air-conditioning unit.

All parts can be installed under the hood of the automobile by means of brackets, with the exception of the evaporator and the metal box casing therefore 35, which will be installed under the dash board by means of tubing 45 which will extend through the wall supporting the evaporator as illustrated in Fig. 2 on the dash board 34, with opening to the inside of the car. There will be a fan, not shown, installed on the back side of the casing 35 remote from the dash board 34 which will blow air through evaporator coils 36 and 39 for air circulation. The evaporator coils 36 and 39 are spread and supported by quarter-inch mesh screen 47 for support, vanes 48 being provided in the front face of the casing 35. From the foregoing, it will be seen that chilled air is created as it enters the car.

The simplicity and easy handling of this air-conditioning unit will be clear from the description since no part need be changed or replaced to keep it in working order but only the generator 10, which is readily accessible beneath the hood of the car.

Referring now particularly to Figs. 4 and 5, and in the further practice of my invention, there is shown a modified form of the present invention, differing from the first form in the provision of a convertible heating unit for winter use.

Hot gases from the exhaust manifold 14 will supply comfortable and sufficient heat for winter driving by running a pipe 48 to a cabinet box 49 located under the dash board 34, the pipe being coiled as at 50 and running back to the intake manifold as at 51. A fan, not shown, in back of the cabinet 49 on the side remote from the driver will blow air over the coils 50, while the intake manifold will have a vacuum pull which will circulate hot gases through the coils 50. The cabinet box 49 is to be fastened to a partition, not shown, under the dash board 34.

A valve 52 to regulate the heat is located on the pipe 48. The valve 52 is preferably operable from the dash board 34. Mechanism for effecting the desired regulation of the valve 52 from the dash board 34 is well known, and has not therefore been shown. Preferably, when opening the valve 52, automatic means will be provided for turning on the fan at the same time, for air circulation, such means being well known.

Referring to Fig. 4, the pipe 13 is connected to the exhaust manifold 14 by a T 53 and continues as pipe 48, which is connected to the coils 50 and cabinet 49 shown in Fig. 5, a close-off valve 54 intermediate the T 53 and the coil 50 disconnecting the heating unit during summer driving.

A valve 55 intermediate the T 53 and generator 10 disconnects the air-conditioning unit during winter driving, while a valve 56 regulates the heat through the generator during summer driving, a union 57 being located intermediate the valves 55 and 56.

The pipe 16 is connected to the intake manifold by a T 58 and continues as pipe 51, which is connected to the coils 50 and cabinet 49 shown in Fig. 5, a close-off valve 59 intermediate the T 58 and the generator 10 disconnecting the air-conditioning unit during winter driving. A union 60 is provided for disconnecting the generator.

A close-off valve 61 intermediate the T 58 and the coil 50 and cabinet 49 is provided for disconnecting the heating unit during summer driving.

In operation, opening the valves 55 and 59 sends heat through the air-conditioning system, while opening the valves 61 and 54 sends heat through the heating unit, it being understood that opening the valves 55 and 59 assumes closing of the valves 61 and 54, and vice versa.

It should now be apparent that there has been provided an air conditioning-unit which can readily and easily be converted to a heating unit during winter driving. If desired, a vacuum pump, not shown, can be installed to augment the vacuum of the intake manifold.

Referring now to Fig. 6, and in the further practice of my invention, there are shown staggered evaporator coils, identical with those shown in Fig. 1, but staggered, one in back of the other, about 2 to 3 inches apart, supported by the ¼ inch mesh screen 47. Conduits 37', 41', 38' and 42' are provided corresponding to conduits 37, 41, 38 and 42 of the first form.

If necessary, additional coils can be added where and when it becomes necessary in order to produce a maximum amount of cold. The generator 10 can also be enlarged proportionately; therefore, the refrigeration capacity can be increased to meet practically any need, such as cold storage trucks, or in any case where cold storage apparatus can be used, so long as there is sufficient heat in the exhaust manifold obtainable by means of the vacuum pull from the intake manifold.

Preferably, the valves 55, 59, 61 and 54 are controlled from the dash board of the car, mechanisms for effecting the desired control being well known in the art and not being therefore shown.

While various changes may be made in the detailed construction, it shall be understood that such changes shall be within the spirit and scope of the present invention as defined by the appended claims:

Having thus set forth and disclosed the nature of my invention, what is claimed is:

1. In an automobile air-conditioning system of the absorption type, a generator in the circulatory system thereof, said generator comprising a liquid tight housing of refractory material, said housing having a top outlet and a bottom inlet communicating with the system, a pipe of heat conductive material entering said generator at the bottom and extending around the interior thereof, the inlet of said pipe being connected to the exhaust manifold of the automobile and the outlet of said pipe being connected to the intake manifold of the automobile.

2. In an automobile air-conditioning system of the absorption type according to claim 1, a casing mounted below the dash board of the automobile, the evaporator coils of the system being housed within said casing, and a fan mounted in back of said system evaporator coils and casing whereby to circulate air therethrough.

3. In an automobile air-conditioning system of the absorption type according to claim 1, a T connecting the inlet of said pipe to the exhaust manifold of the automobile, a second pipe connected to said T, said second pipe being coiled, a second T connecting the outlet of said first pipe to the inlet manifold of the automobile, said second pipe being connected to said second T, a first close-off valve on said first pipe intermediate said first T and said generator, a second close-off valve on said first pipe intermediate said generator and said second T, a third close-off valve on said second pipe intermediate said first T and said coiled portion of said second pipe, a fourth close-off valve on said second pipe intermediate said coiled portion thereof and said second T whereby the hot gases from the exhaust manifold can pass alternately through either the generator into the air-conditioning system or into the coiled portion of said second pipe.

4. In an automobile air-conditioning system of the absorption type according to calim 1, a T connecting the inlet of said first pipe to the exhaust manifold of the automobile, a second pipe connected to said T, said second pipe being coiled, a second T connecting the outlet of said first pipe to the inlet manifold of the automobile, said second pipe being connected to said second T, means for alternately circulating the hot gases through either the air-conditioning system or through the coiled portion of said second pipe, a cabinet located under the dash board, said coiled portion of said second pipe being enclosed within said cabinet, and a fan mounted in back of said cabinet whereby to circulate air therethrough.

5. In an air-conditioning system of the absorption type for an automobile, according to claim 1, a casing mounted below the dash board of the automobile, the system including a plurality of separate evaporator coils, said coils being housed within said casing and staggered with respect to each other, and a fan mounted in back of said casing whereby to circulate air therethrough.

HARLEY LEE COGGBURN.

References Cited in the file of this patent

UNITED STATES PATENTS

| Number | Name | Date |
|---|---|---|
| 1,983,056 | Teichmann | Dec. 4, 1934 |
| 2,187,982 | Moncrief | Jan. 23, 1940 |
| 2,568,789 | Coggburn | Sept. 25, 1951 |
| 2,592,712 | Knoy | Apr. 15, 1952 |